Patented June 5, 1923.

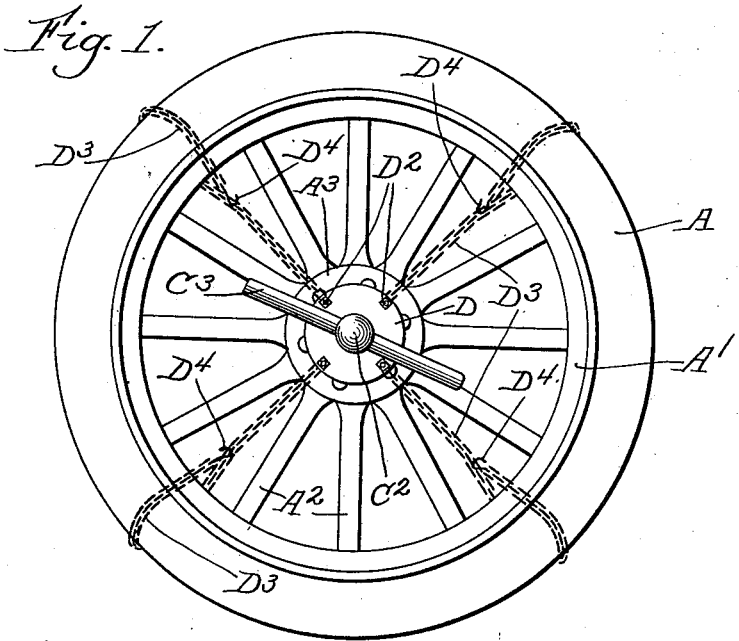
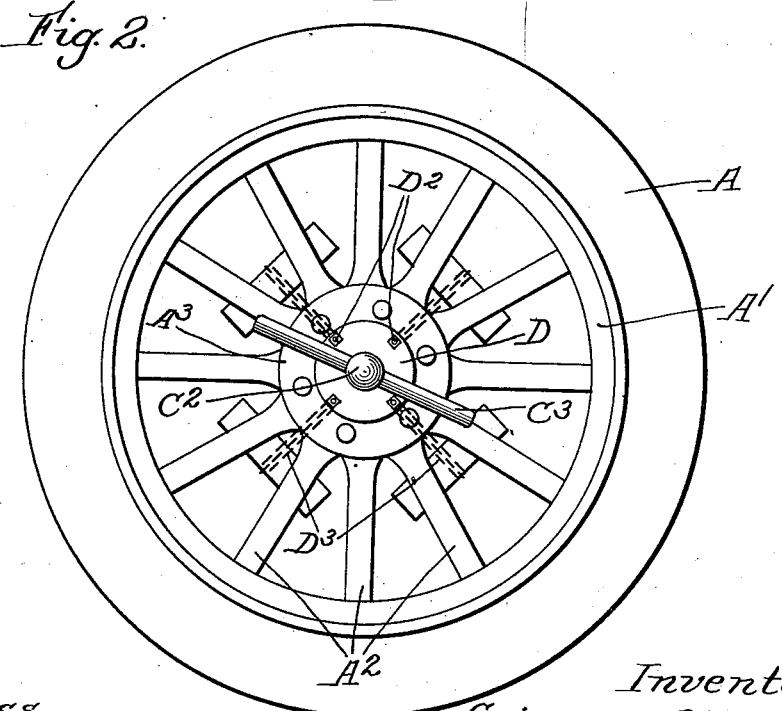

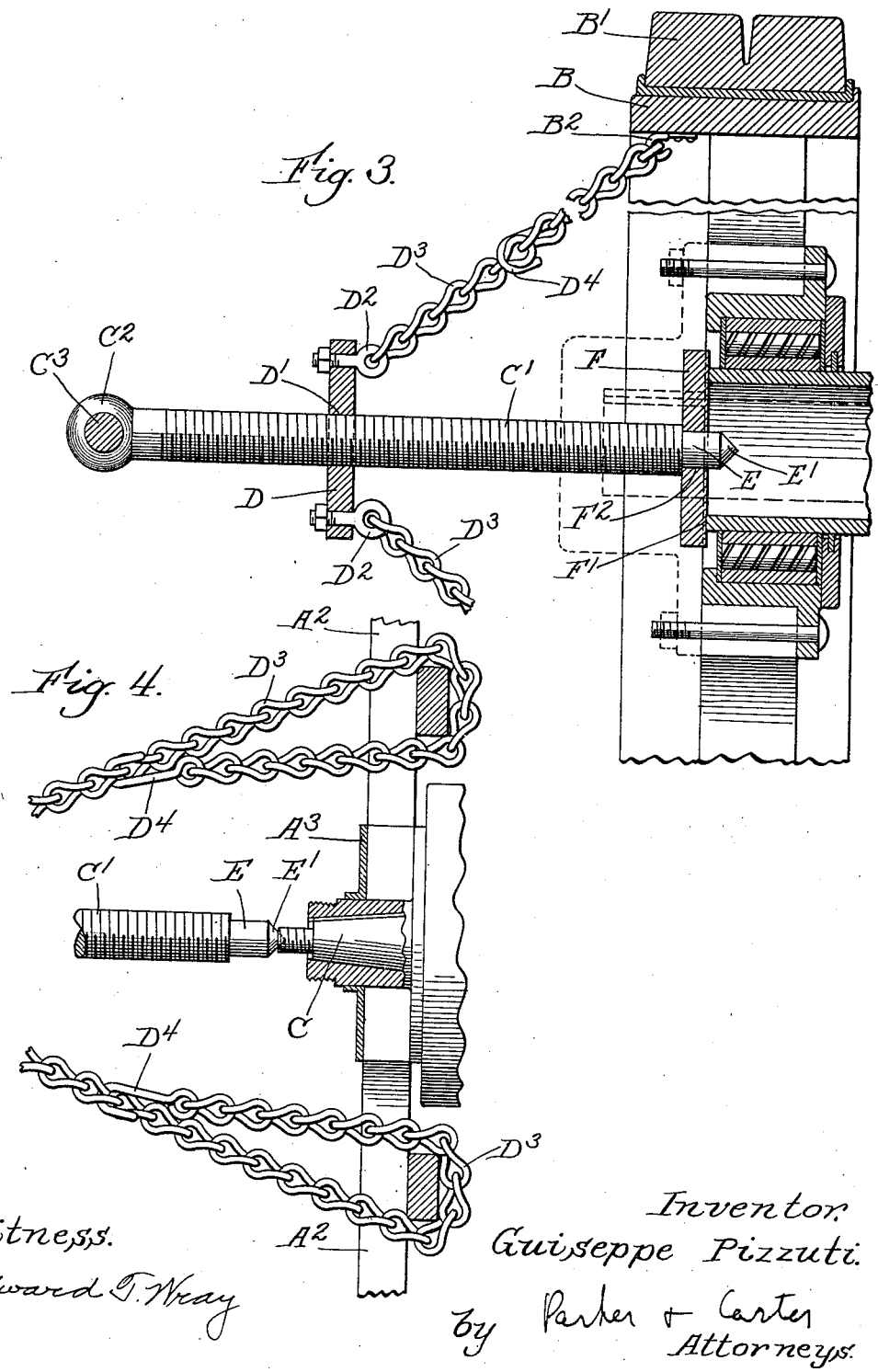

1,457,795

UNITED STATES PATENT OFFICE.

GIUSEPPE PIZZUTI, OF CHICAGO, ILLINOIS.

WHEEL REMOVER.

Application filed October 27, 1921. Serial No. 510,788.

*To all whom it may concern:*

Be it known that I, GIUSEPPE PIZZUTI, a citizen of the United States, residing at Chicago, in the county of Cook and State of Illinois, have invented a certain new and useful Improvement in Wheel Removers, of which the following is a specification.

My invention relates to a wheel puller or remover, the purpose of which is to enable wheels to be easily removed from the shafts on which they are mounted. My invention is applicable to any wheel which must be removed or pulled off of a shaft, but I have illustrated it as applied to the removal of automobile wheels, both of a type which rotates on fixed axles and on floating removable axles.

My invention is illustrated more or less diagrammatically in the accompanying drawings, wherein—

Figure 1 is an elevation of one application of my invention;

Fig. 2 is an elevation of another method of using it;

Fig. 3 is a section through an automobile wheel the floating axle of which has been removed, and Fig. 4 is a section through an automobile wheel of the fixed type.

Like parts are represented by like letters and numbers throughout the drawings.

A is an automobile wheel having a rim $A^1$, spokes $A^2$ and a hub $A^3$. In Fig. 3 a heavy truck wheel is illustrated, with a heavy rim B, a solid tire $B^1$ and hooks $B^2$ such as are usually placed on truck wheels to secure anti-skid chains.

Adapted to engage the end of the axle C, as shown in Fig. 4, is the screw-threaded shaft $C^1$, which has at the outer end a perforated ball $C^2$ through which passes a bar or handle $C^3$ which may be made removable if desired.

Mounted to travel on the screw-threaded shaft is the block or disk D, which is perforated as at $D^1$, the perforation being screw-threaded to fit the shaft $C^1$. Secured in the disk D are four eye-bolts $D^2$ to which are fastened the chains $D^3$, the outer ends of which are fitted with the hooks $D^4$ of a size proper to fit within the mesh of the chain.

The inner end of the shaft $C^1$ consists of a reduced cylindrical portion E which terminates in a conical point $E^1$.

In Fig. 3 the invention is seen applied to an automobile wheel of the floating axle type, wherein the axle has been removed. A bearing disk or block F is shown, which is adapted to engage the edge $F^1$ of the axle housing. This disk F is centrally perforated as at $F^2$, to receive the reduced cylindrical portion E of the shaft $C^1$.

The details of hub and axle are not further described, since they form no part of the present invention.

While I have illustrated a working device and one which has actually and successfully been put to use, it will be realized that many changes might be made in the shape, number, disposition and relation of parts without departing from the spirit of my invention, and I do not wish to be limited to the form or application herein disclosed.

The use and operation of my invention are as follows:

Ordinarily when it is desired to remove an automobile wheel the hub cap is unscrewed and the wheel is worked off by hand, at great exertion and with great delay. Wheel removers, the details of which need not be herein given, are supplied for some makes of car, but are not particularly efficient and are not adaptable to other makes and sizes. Applicant has developed a wheel remover which not merely will fit all sizes and types of automobile and wheel but may be used to remove any wheel from any shaft. In the type of wheel which is mounted on a fixed axle, such as illustrated in Fig. 4, the conical point $E^1$ is applied to the end of the shaft, the point fitting in the lathe center indentation which is always present at the end of the shaft. The chains are then hooked about the tire or secured to the hooks $B^2$ of the rim, or looped about blocks of wood as shown in Fig. 4. The hook is adjustable along the chain and the chains are normally drawn fairly tight to prevent any tendency of the block D to rotate. The chains should be so adjusted that the shaft $C^1$ lies along a prolongation of the axis of the axle. The operator then turns the handle $C^3$ and the rotation of the shaft $C^1$ causes the block D to travel towards the outer end of the shaft. A very few turns of the handle is sufficient to loosen the wheel, particularly if the operator taps the axle or the wheel to aid the loosening operation. Once the wheel is loosened, the remover is taken down and the wheel lifted off.

In the form of axle shown in Fig. 3, where the floating axle is removed from the axle casing and there is no axle end against which the shaft C¹ can bear, the block or disk F is used, the perforated center of which rotatably receives the reduced end E of the shaft. The device is applied and tightened in the same way and a few turns of the handle will serve to loosen the wheel.

It will, of course, be understood that this device is applicable to any make and variation of automobile wheel, and if sufficiently heavily made can be used to remove heavy wheels from shafts such as are used, for example, in machine shops.

I claim:

1. A wheel remover comprising a rotatable screw threaded shaft, and a handle secured thereto, a member adapted to be moved along said shaft by the rotation of said shaft, means, adapted to prevent its rotation with the shaft, for securing it to an automobile wheel, the end of said shaft opposite the handle terminating in a cylindrical section of lesser diameter than the screw threaded portion of the shaft, an apertured bearing plate, in rotatable relation with the shaft, and removably mounted upon said cylindrical section and adapted to abut against the shoulder formed by the intersection of the reduced portion and the screw threaded portion of the shaft.

2. A wheel remover comprising a rotatable screw threaded shaft, and a handle secured thereto, a member adapted to be moved along said shaft by the rotation of said shaft, means, adapted to prevent its rotation with the shaft, for securing it to an automobile wheel, the end of said shaft opposite the handle terminating in a cylindrical section of lesser diameter than the screw threaded portion of the shaft, it terminating in a conical tip, and an apertured bearing plate in rotatable relation with the shaft, and removably mounted upon said cylindrical section and adapted to abut against the shoulder formed by the intersection of the reduced portion and the screw threaded portion of the shaft.

Signed at Chicago county of Cook and State of Illinois, this 21st day of October 1921.

GIUSEPPE PIZZUTI.